United States Patent [19]
Nakamura et al.

[11] Patent Number: 4,733,352
[45] Date of Patent: Mar. 22, 1988

[54] LOCK CONTROL FOR A SHARED STORAGE IN A DATA PROCESSING SYSTEM

[75] Inventors: Kouji Nakamura; Kanji Kubo; Katsuro Wakai, all of Hadano; Makoto Kishi, Ashigarakamigun; Toshihisa Matsuo, Atugi, all of Japan

[73] Assignee: Hitachi, Ltd., Tokyo, Japan

[21] Appl. No.: 687,913

[22] Filed: Dec. 31, 1984

[30] Foreign Application Priority Data

Dec. 30, 1983 [JP] Japan ............... 58-247670

[51] Int. Cl.⁴ ............................................. G06F 13/00
[52] U.S. Cl. ............................................. 364/200
[58] Field of Search ... 364/200 MS File, 900 MS File

[56] References Cited

U.S. PATENT DOCUMENTS

| | | | |
|---|---|---|---|
| 3,469,239 | 9/1969 | Richmond et al. | 364/200 |
| 4,056,844 | 11/1977 | Izumi | 364/200 |
| 4,136,386 | 1/1979 | Annunziata et al. | 364/200 |
| 4,561,051 | 12/1985 | Rodman et al. | 364/200 |

Primary Examiner—Archie E. Williams, Jr.
Assistant Examiner—Michael J. Ure
Attorney, Agent, or Firm—Antonelli, Terry & Wands

[57] ABSTRACT

In a lock control for a shared storage, each storage controller (SC) includes circuitry (LKA) for holding the addresses locked by any of the storage utilizing units connected thereto and circuitry (FLKA) for holding a copy of the contents of LKAs of the other SCs. When one storage utilizing unit connected to one SC issues a storage access request, its requested address is compared with the contents of the LKA and FLKA in the associated SC, thus determining whether or not the requested address is locked by any other storage utilizing unit connected to that particular SC or by any of the storage utilizing units connected to the other SCs. Each storage utilizing unit may include a FLKA.

5 Claims, 3 Drawing Figures

LOCK CONTROL FOR A SHARED STORAGE IN A DATA PROCESSING SYSTEM

BACKGROUND OF THE INVENTION

The present invention relates to a storage system, and more particularly to a lock control for a storage shared by a plurality of storage utilizing units, such as central processors, I/O processors, etc.

In a system in which a plurality of storage utilizing units are sharing a main storage and are operating independently, such as a multiprocessing system, during the time when one storage utilizing unit is accessing a certain storage area of the main storage, or during the time when there is a possibility of instruction retry being performed with respect to data within a certain storage area, the access to the storage area by the remaining storage utilizing units must be inhibited. Such access inhibition as described above is called "lock".

One of the storage lock controls according to the prior art is disclosed in the European Patent Publication No. 0061570 in which a lock bit is associated with each entry of a cache directory which belongs to each processor (CP) and the lock bit in the ON state or "1" state indicates that the main storage area represented by an address within the associated entry is locked. In this control system, when an access request is issued by one CP, the cache directories of the remaining CPs are searched in order to determine whether or not the requested address has been locked by other CPs. Accordingly, the cache directory of each CP additionally undergoes search operations caused by access requests from the other CPs. An access request from any one of the CPs can be accepted after the cache directories of the remaining CPs have been checked and after having confirmed that the requested address has not been locked by any other CPs.

If a special register for holding the locked address is prepared in each CP, separately from the cache directory, every cache directory is released from the search operation which is due to access requests from other CPs. In this case, however, all the special registers in the remaining CPs must be referred to before determining if the access request from a certain CP is allowed, thus leaving the turn around time unimproved. If the lock control is carried out by a single storage controller intervening between the shared storage and the plurality of CPs, with the whole locked addresses of the entire CPs being held in the controller, the problem mentioned above may be overcome. In a system including a plurality of storage controllers, however, similar problems as described above will occur with respect to these storage controllers.

SUMMARY OF THE INVENTION

It is therefore an object of the present invention to provide an improved lock control for a shared storage.

It is another object of the present invention to provide a lock control for a shared storage with a less busy rate of the cache directory as well as with a decreased turn around time.

It is yet another object of the present invention to provide a lock control for a shared storage in which a decision of whether or not the requested address has been locked can be made without searching the cache directories or lock address registers in the other storage utilizing units or storage controllers.

According to the present invention, each storage utilizing unit has means for holding a copy of the addresses locked by the other storage utilizing units. When one storage utilizing unit issues an access request, the requested address involved in the request is compared with the copy of the locked addresses kept in the requesting unit, and if the result of the comparison shows an coincidence, the request is rejected.

On the other hand, in a system having a plurality of storage controllers each intervening between the shared storage and a plurality of the storage utilizing units, each storage controller has means for holding the addresses locked by the storage utilizing units connected to it and means for holding a copy of the addresses locked by the storage utilizing units connected to the remaining storage controllers, and a requested address from one storage utilizing unit is compared with the locked addresses and the copy of the locked addresses kept in the controller connected to the requesting unit.

DESCRIPTION OF THE PREFERRED EMBODIMENT

Figure 1:
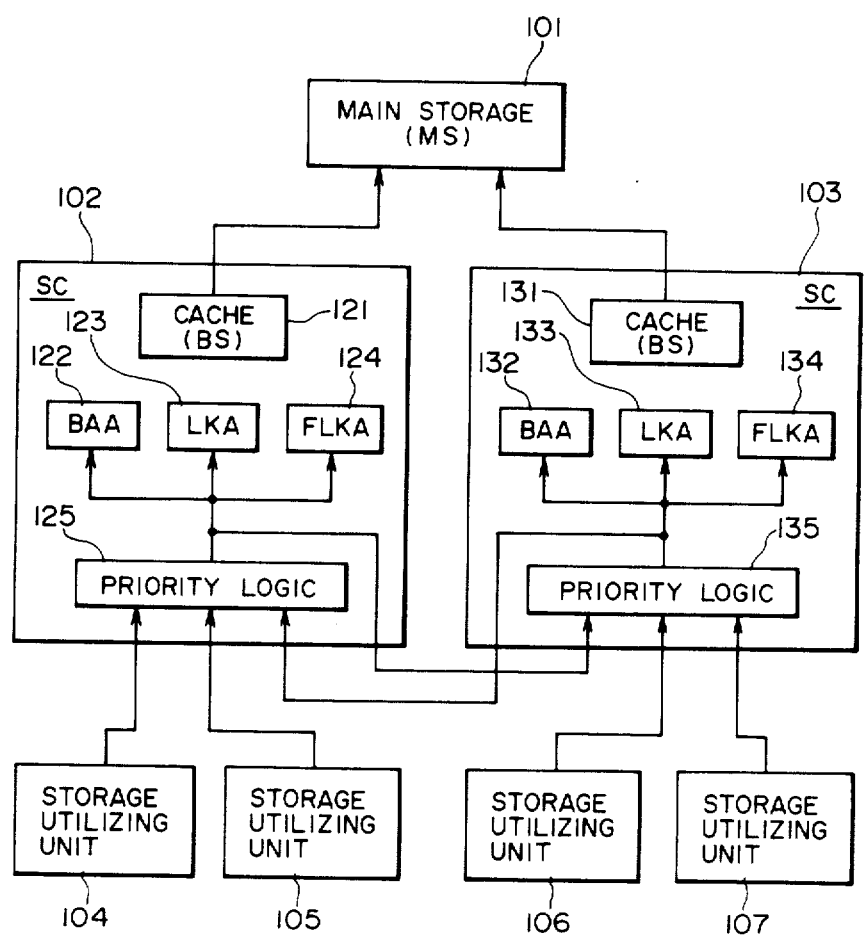
FIG. 1 illustrates schematically a data processing system including one embodiment of the present invention in a block diagram.

Referring to FIG. 1, a main storage (MS) 101 is connected to two storage utilizing units 104 and 105, such as a central processor, I/O processor, etc., through a storage controller (SC) 102, as well as to two other storage utilizing units 106 and 107 through another storage controller 103, and the main storage 101 is thus shared by the four storage utilizing units 104 through 107.

The storage controller (SC) 102 comprises a cache memory (BS) 121 and a cache directory (BAA) 122 associated therewith, a first lock decision section (LKA) 123, a second lock decision section (FLKA)124, and a priority logic 125.

A detailed description of the LKA 123 and the FLKA 124 will be made later. The priority logic 125 determines the priority for handling the requests from the storage utilizing units 104 and 105 connected to the SC 102 and from the other SC 103.

The structure of the SC 103 is substantially identical with the SC 104 and it comprises a BS 131, a BAA 132, a LKA 133, a FLKA 134, and a priority logic 135, which correspond to the BS 121, the BAA 122, the LKA 123, the FLKA 124, and the priority logic 125 in the SC 102, respectively.

Figure 2:
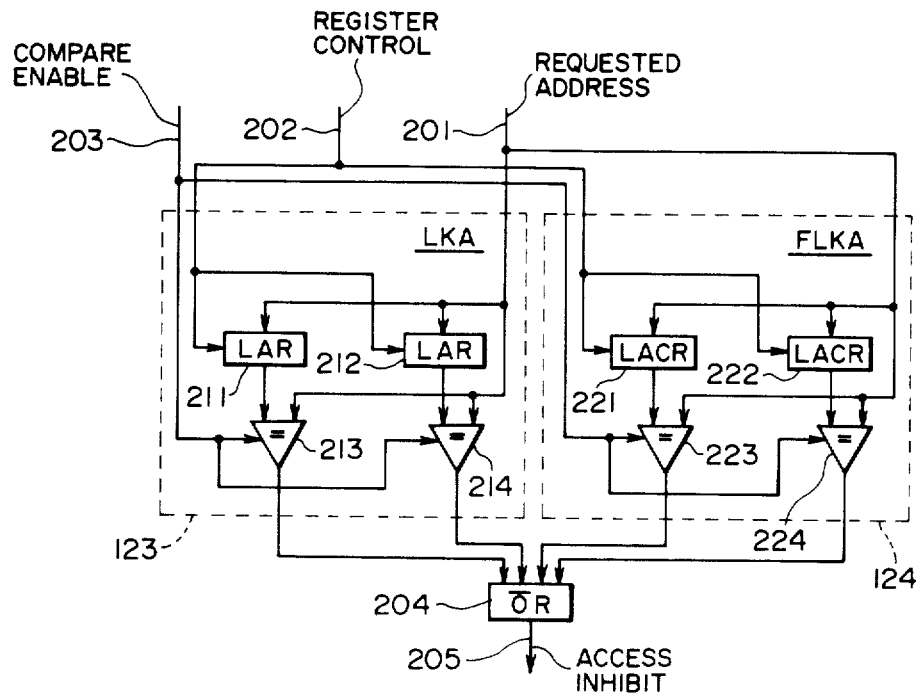
FIG. 2 illustrates in a block diagram the details of a first lock decision section (LKA) and a second lock decision section (FLKA) in FIG. 1.

FIG. 2 shows detailed constructions of the LKA 123 and the FLKA 124. In the figure, a line 201 carries a requested address involved in a request selected by the priority logic 125 of FIG. 1, while a register control line 202 represents control lines for controlling lock address registers 211, 212 and lock address copy registers 221 and 222 (to be described later) in case that the request selected by the priority logic 125 requests "se" or "reset" of the lock. A compare enable line 203 is a line for a signal which controls whether or not a requested address involved in a request selected by the priority logic 125 should be compared with the contents of the lock address registers 211, 212 and the lock address copy registers 221, 222.

The LKA 123 comprises a lock address register (LAR) 211 associated with the storage utilizing unit 104, a lock address register (LAR) 212 associated with the storage utilizing unit 105, a first comparing circuit 213 for comparing a requested address with the contents of the LAR 211, and a second comparing circuit 214 for comparing a requested address with the contents of the LAR 212. The lock address registers 211 and 212 contain the addresses locked by their associated storage utilizing units 104 and 105, respectively.

The FLKA 124 especially provided according to the present invention comprises a lock address copy register (LACR) 221 associated with the storage utilizing unit 106, a lock address copy register (LACR) 222 associated with the storage utilizing unit 107, a third comparing circuit 223 for comparing a requested address with the contents of the lock address copy register 221, and a fourth comparing circuit 224 for comparing a requested address with the contents of the lock address copy register 222. The lock address copy registers 221 and 222 contain a copy or image of the contents of the lock address register associated with the storage utilizing unit 106 and a copy of the lock address register associated with the storage utilizing unit 107, respectively, in the LAK 133 of the other SC 103. Each of the lock address registers 211, 212 and the lock address copy registers 221 and 222 consists of a lock address portion and a validity flag portion. The coincidence outputs from each of the comparing circuits 213, 214, 223, and 224 are applied to an OR circuit 204, so as to produce an access inhibit signal 205.

The LKA 133 and the FLKA 134 in the SC 103 are similar to the LKA 123 and FLKA 124, respectively, except that the lock address registers in the LKA 133 are associated with the storage utilizing units 106 and 107 respectively, while the lock address copy registers in the FLKA 134 contain a copy of the contents of the lock address registers 211 and 212 in the LKA 123, respectively.

In operation, supposing that an access request for a certain address in the main storage 101 is issued by the storage utilizing unit 104, the requested address involved in the request is applied to the comparing circuits 213, 214, 223, and 224 through the line 201 when the request is selected by the priority logic 125. Since no control, i.e. set or reset, is required for both the lock address registers and the lock address copy registers in this case, the signal on the control line 202 remains OFF condition. In order to determine if any of the remaining storage utilizing units 105 through 107 has locked the requested address in question, the compare enable signal 203 for the comparing circuits 214, 223, and 224 associated with the remaining storage utilizing units is turned ON and then the contents of the lock address register 212 and the lock address copy registers 221 and 222 are compared with the requested address from the storage utilizing unit 104. In this case, however, no comparison is carried out with the addresses locked by the storage utilizing unit 104 per se and a non-coincidence signal is produced from the comparing circuit 213.

When a coincidence occurs in any of the comparing circuits with respect to the addresses and the validity flag of the lock address register associated therewith has been set, "1" output is produced from that particular comparing circuit. Accordingly, the output signal 205 from the OR circuit 204 becomes "1" and this indicates that the access request from the storage utilizing unit 104 is the one which is directed to the area already locked by some of the other storage utilizing units. As a result, the search of BAA 122 is inhibited and the access to either the BS 121 or the MS 101 is not permitted.

Figure 3:
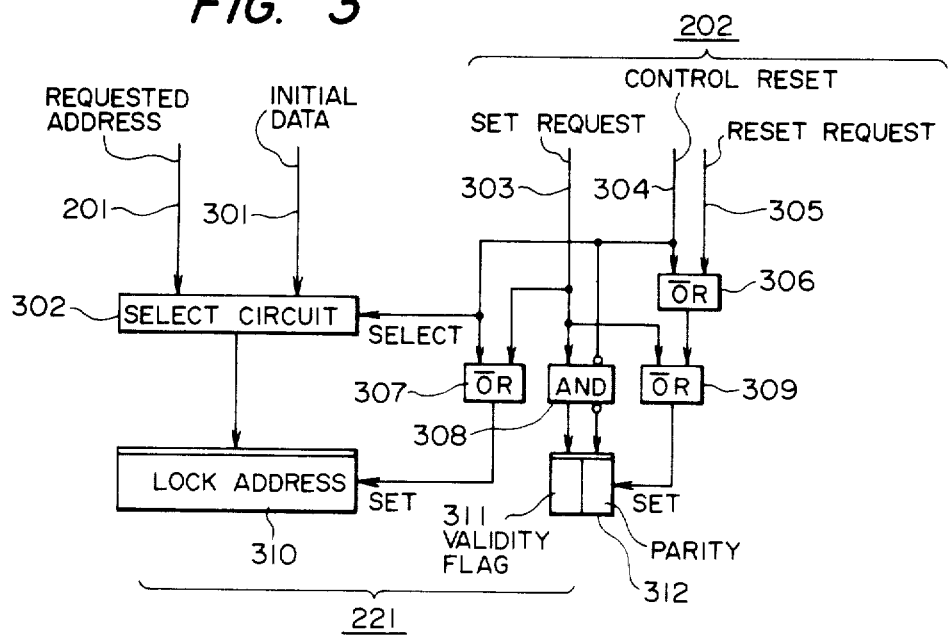
FIG. 3 illustrates in a detailed block diagram a lock address copy register and its peripheral circuitry in FIG. 2.

The control of the FLKA will now be described with reference to FIG. 3 which illustrates the lock address copy register 221 and its peripheral circuitry in the FLKA 124. The other lock address copy register 222 in the FLKA 124 and the two lock address copy registers in the FLKA 134 are the same as those shown in FIG. 3. Furthermore, each of the lock address registers in the LKA 123 and in the LKA 133 shown, for instance, in FIG. 2 is substantially the same as those shown in FIG. 3. The lock address copy register 221 is associated with the storage utilizing unit 106 and it comprises a lock address portion 310, and a validity flag portion consisting of a validity flag 311 and a parity 312 for the validity flag 311. A set request line 303, a control reset line 304, and a reset request line 305 in FIG. 3 correspond to the register control line 202 in FIG. 2 as a whole.

Returning to FIG. 1, when the storage utilizing unit 106 issues a lock set request to the SC 103 and it is selected by the priority logic 135, the locked address is set in the lock address register associated with the storage utilizing unit 106 of the LKA 133 in the SC 103, and a registration request is issued from the SC 103 to the lock address register 221 associated with the storage utilizing unit 106 of the FLKA 124 in the SC 102. During the time when such FLKA registration request is being transmitted from the SC 103 to the SC 102, the SC 102 is inhibited from sending a FLKA registration request to the SC 103, thus keeping the sequence of execution of commands. The priority logic 125 in the SC 102 accepts a FLKA registration request from the SC 103 with the topmost priority.

In the FLKA 124, in response to the FLKA registration request thus accepted, a set request signal 303 for the lock address copy register 221 associated with the storage utilizing unit 103 becomes "1". If a FLKA control reset signal 304 is "0" at the time, the registration request address on the requested address line 201 is selected by a select circuit 302 and is applied to the address portion 310 of the lock address copy register 221.

With respect to the validity flag portion, the output from an AND circuit 308 supplies "1" to the validity flag 311 while it supplies "0" to the parity 312 (In the present embodiment, odd parity is employed). Meanwhile, a set signal for the address portion and validity flag portion is derived from the set request signal 303 through OR circuits 307 and 309, and the loading of the supplied data mentioned above is effected.

When the storage utilizing unit 106 issues a lock reset request to the SC 103 and it is selected by the priority logic 135, the lock address register associated with the storage utilizing unit 106 in the LKA 133 is reset and a reset request is issued from the SC 103 to the FLKA 124 in the SC 102. When the request is selected by the priority logic 125 in the SC 102, a reset request signal 305 for the lock address copy register 221 associated with the storage utilizing unit 106 in the FLKA 124 becomes "1". At this point, since the set request signal 303 never becomes "1" at the same time, "0" is supplied to the validity flag 311 of the validity flag portion of the lock address copy register 221 while "1" is supplied to the parity 312. Meanwhile, a set signal for the validity flag portion is derived from the reset request signal 305 through OR circuits 306 and 309, and the loading of the supplied data mentioned above is effected. The address portion 310 remains unchanged, but the lock condition is substantially reset by the reset of the validity flag. In this case, however, initial data 301 may be loaded to the address portion 310 through the select circuit 302.

In order to reset the lock address copy register 221 associated with the storage utilizing unit 106 on resetting the control logic for the storage utilizing unit 106, the FLKA 124 is provided with the control reset signal 304. When the control reset signal 304 becomes "1", the initial data 301 is selected by the select circuit 302 and is applied to the address portion 310, even if the registration request to the FLKA 124 has been selected at the time by the priority logic 125. On the other hand, the AND circuit 308 supplies "0" to the validity flag 311 and "1" to the parity 312. During that time, a set signal is derived from the control reset signal 304 through the OR circuit 307 and the OR circuits 306 and 309, and the above-mentioned supplied data is set. In the case where both an address and its parity are to be registered into the address portion, the parity of the address portion can not be guaranteed at the time of power ON, for example. Under these conditions, it will be useful to store the initial data 301 into the address portion 310 at the time of resetting the control in view of the guarantee of the parity.

In the embodiment described above, each time the LKA in either one of the SCs is set, the FLKA in the other SC is also set. However, in the case where each SC has information capable of teaching that areas locked by its associated storage utilizing units do not exist in the BS of the other SC, another mode of control is possible. In this case, when one storage utilizing unit, say, 106 connected to one SC, say, 103 locks one area, the registration to the FLKA 124 in the SC 102 is retained unless the locked area exists in the BS, say, 121 in the other SC, say, 102. Afterwards, when the SC 102 accepts an access request for an area which does not exist in the BS 121, the SC 102 searches the LKA 133 in the SC 103, and registers the address which has been registered in the LKA 133 into the FLKA 124 so long as the area in question is found to be locked.

Although the LKAs and FLKAs are provided in the storage controllers in the embodiment described above, each storage utilizing unit may have a FLKA for its own use.

Moreover, instead of providing registers for registering the locked addresses, each entry of the cache directories may contain a lock bit, or such lock bits may be accommodated in separate arrays. In these cases, the registration data and control mode of the FLKA are similar to those described above.

As is apparent from the foregoing description of the invention, when determining whether or not the requested address belongs to the locked area according to this invention, it is not necessary to refer to cache directories or lock address registers in the other units or storage controllers. Accordingly, the busy rate and the turn around time of the cache directories etc. can be reduced, with the result that the system performance of the storage sharing system can be strikingly improved.

What is claimed is:

1. A lock control for a storage having a plurality of addressable storage locations shared by a plurality of storage utilizing units each capable of locking desired storage locations in said storage, comprising a plurality of lock control means each connected to at least one of said storage utilizing units for executing lock control for the storage utilizing unit or units connected thereto, each of said lock control means including:
   lock address holding means for holding addresses of storage locations locked by said storage utilizing unit or units connected thereto;
   lock address copy holding means for holding a copy of addresses of storage locations locked by the storage utilizing unit or units connected to another lock control means;
   lock request receiving means connected to respective lock request receiving means of another lock control means for communicating a requested address involved in a storage location lock request;
   comparing means for comparing a requested address involved in a storage location access request from one of said connected storage utilizing unit or units with the contents of said lock address holding means and said lock address copy holding means, except for the addresses of storage locations locked by the storage utilizing unit which has issued said storage access request; and
   means operatively connected to said comparing means for controlling the processing of said storage access request according to the result of comparison by said comparing means.

2. A lock control as claimed in claim 1, wherein each of said lock address holding means and lock address copy holding means comprises a lock address portion for holding locked addresses and a validity flag portion for indicating whether the contents of said lock address portion is valid or not.

3. A lock control as claimed in claim 1, wherein the coincidence output from said comparing means is subject to validity indicated by said validity flag portion.

4. A lock control as claimed in claim 1, wherein said storage is connected to a plurality of storage controllers each connected in turn to a different group of said storage utilizing units for controlling storage access of the storage utilizing units connected thereto, and each of said storage controllers includes one of said lock control means.

5. A lock control as claimed in claim 4, wherein each of said storage controllers further includes a cache memory and its associated cache directory.

* * * * *